March 2, 1926.  
R. L. AMES  
VEHICLE SIGNAL  
Filed Nov. 19, 1923
1,575,404
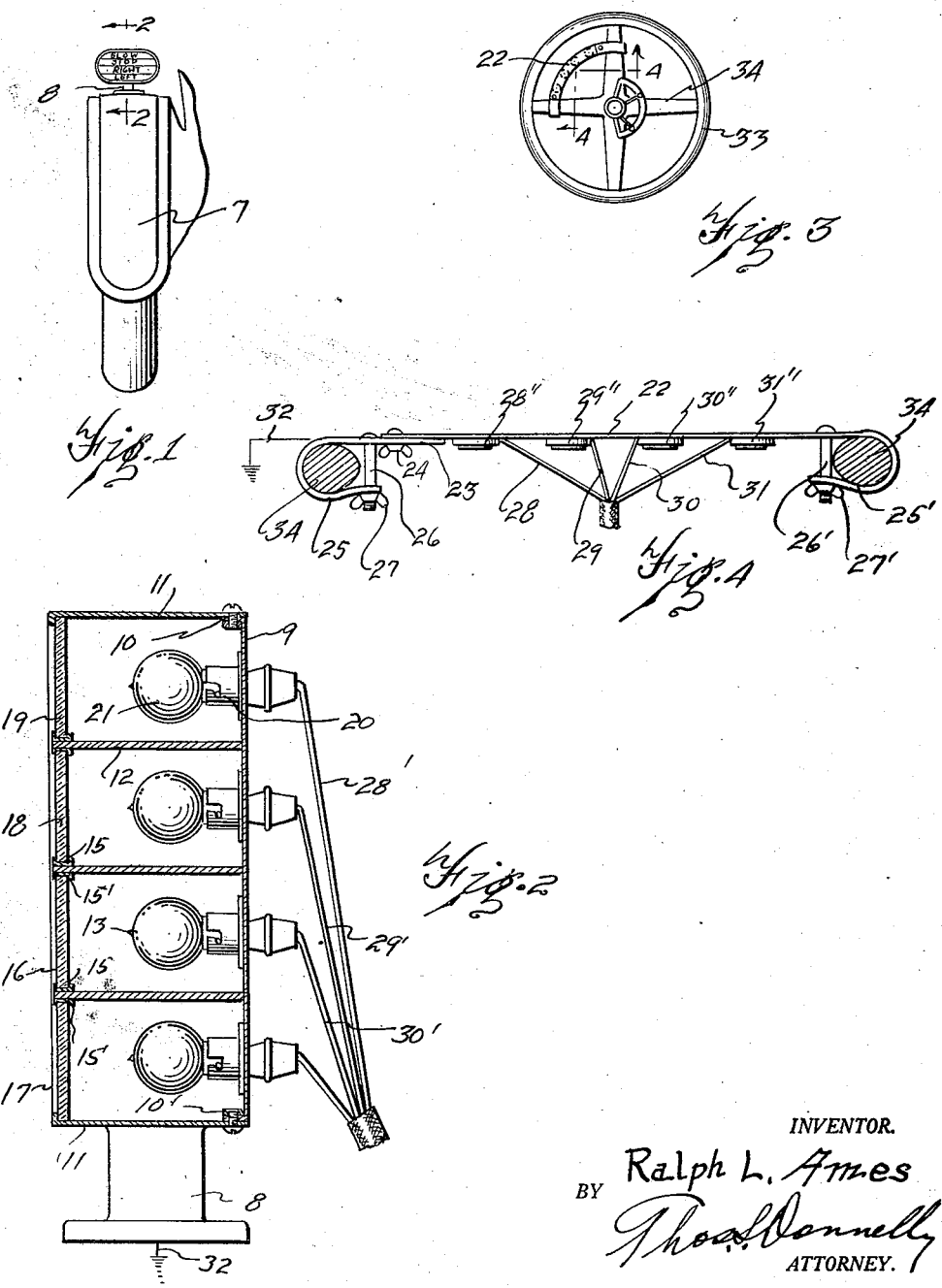
INVENTOR.  
Ralph L. Ames  
BY  
Thos. Donnelly  
ATTORNEY.

Patented Mar. 2, 1926.

1,575,404

UNITED STATES PATENT OFFICE.

RALPH L. AMES, OF DETROIT, MICHIGAN.

VEHICLE SIGNAL.

Application filed November 19, 1923. Serial No. 675,557.

*To all whom it may concern:*

Be it known that I, RALPH L. AMES, a citizen of the United States, residing at Detroit, in the county of Wayne and State of Michigan, have invented a new and useful Improvement in a Vehicle Signal, of which the following is a specification.

My invention relates to a new and useful improvement in a vehicle signal and has for its object the provision of a vehicle signal which will be simple in structure, economical of manufacture, and highly efficient in use.

Another object of the invention is the provision in a vehicle signal of means for operating the same adapted for attachment to the steering wheel of a vehicle, and embodying means for adjusting the position of said regulating means relatively to the steering wheel.

Another object of the invention is the provision of means for operating the vehicle signal solely during the actual manipulation of the operating means.

Other objects will appear hereinafter.

The invention consists in the combination and arrangement of parts hereinafter described and claimed.

The invention will be best understood from the accompanying drawings which form a part of this specification and in which, Fig. 1 is an elevational view of the invention attached to a vehicle, Fig. 2 is a sectional view taken on substantially line 2—2 of Fig. 1, Fig. 3 is a top plan view of a steering wheel showing the attaching means, and, Fig. 4 is a sectional view taken on substantially line 4—4 of Fig. 3.

The invention is designed for use on a vehicle particularly on automobiles, to indicate the intentions of the driver of the vehicle.

The invention in its preferred form comprises a housing having a standard 8 attached to the base 11 of the housing and mounted upon the fender 7 of the vehicle or at any other desirable place on the vehicle. A rear wall line is provided for the housing which has an inwardly projecting flange 10 adapted to be secured to the side walls 11 of the housing.

Projecting from the rear wall 9 are partitions 12, 13 and 14 which extend the full width of the housing and are securely embraced at their free ends by channel members 15 and 15', which are attached to the side walls of the housing. Enclosing the front of the housing are glass members 16, 17, 18 and 19 which engage in the channels of the members 15 and 15' and are securely held in position by the overturned edge of the housing wall. As shown in Fig. 1, these glass members are provided with indicating words printed thereon, the portion of the glass on which the words are printed being more clearly transparent than the remainder of the glass. As shown in Fig. 2, the housing is divided into four separate compartments. Projecting into each compartment is a socket 20 in which is mounted a lamp 21, the sockets of the various compartments being connected to a suitable source of electrical energy by means of wires 28', 29', 30' and 31'. A ground wire 32 is also connected to each of the lamps.

A segment 22 which is made preferably of metal is used to attach the operating means to the steering wheel 33 of the vehicle. This segment is formed sectional, the portion 23 having a slot formed therein through which a bolt projects. Said bolt is provided with a wing nut 24 whereby the length of the segment may be adjusted. The member 23 is doubled upon itself to provide a clamping portion 25. A bolt 26 and a suitable wing nut 27 serve to bind this segment upon the spider 34 of the wheel. The section 22 is also doubled upon itself to provide a clamping member for portion 25' which is operated by a bolt 26' and a wing nut 27'. Mounted on the segment are switches which are spring operated, in the usual manner, so that as long as the button of the switch is pressed inwardly, the circuit will remain closed. Wires 28, 29, 30 and 31 connect the spring switches 28", 29", 30" and 31" each to a light in the housing, so that upon pressing the button to close the switch a specific light in one of the compartments will be lighted. As soon as the pressure is relieved from the switch, the circuit will be broken so that the probability of the operator of the vehicle lighting one of the lights and leaving it lighted, is obviated.

By forming the segment sectional as indicated, the relative position of the segment to the rim of the steering wheel may be easily and quickly adjusted so that the operator of the vehicle may quickly and easily place the operating switches in the most convenient position for his individual operation. While I have illustrated and described the preferred form of construction, I do not wish to limit myself to the precise details of structure set out, but desire to avail myself of such variations and modifications as come within the scope of the appended claims.

Having thus described my invention what I claim as new and desire to secure by Letters Patent is:

1. An electric switch support adapted for attachment to a spoked steering wheel having a rim, comprising an elongated supporting member, the ends of said supporting member being curved to embrace and adapted to clamp upon the spokes of said wheel, the distance between said ends being variable to permit their clamping engagement with said spokes at various positions relatively to said rim.

2. An electric switch support adapted for attachment to a spoked steering wheel having a rim comprising a switch supporting member having one end curled and adapted for embracing one of the spokes of said wheel; means operably connected with said curled end for clamping the same in engagement with said spokes at will, the opposite end of said supporting member having an elongated slot formed therein; an extension member having one end curled and adapted for clamping engagement with the spokes of said wheel, the opposite end being provided with an elongated slot adapted for registering with said first mentioned slot; and means projected through said slots for binding said members together in fixed relation, said means permitting a varying of the distance between said curled ends to permit the mounting of said switch supporting member at varying distances of said spokes from the center of said wheel; and a plurality of switches mounted on said supporting member.

In testimony whereof I have signed the foregoing specification.

RALPH L. AMES.